US011466783B2

(12) United States Patent
Choate et al.

(10) Patent No.: US 11,466,783 B2
(45) Date of Patent: Oct. 11, 2022

(54) SIDE ENTRY VALVE

(71) Applicant: Baker Hughes Oilfield Operations LLC, Houston, TX (US)

(72) Inventors: Jeremy Choate, Houston, TX (US); Keith M. Adams, Katy, TX (US); Lloyd Cheatham, Lake Jackson, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 165 days.

(21) Appl. No.: 16/829,664

(22) Filed: Mar. 25, 2020

(65) Prior Publication Data
US 2021/0301927 A1    Sep. 30, 2021

(51) Int. Cl.
| F16K 3/02 | (2006.01) |
| F16K 1/36 | (2006.01) |
| F16K 1/42 | (2006.01) |
| F16K 3/316 | (2006.01) |
| F16K 27/04 | (2006.01) |

(52) U.S. Cl.
CPC ............ *F16K 1/36* (2013.01); *F16K 1/42* (2013.01); *F16K 3/0272* (2013.01); *F16K 3/316* (2013.01); *F16K 27/044* (2013.01)

(58) Field of Classification Search
CPC ............ F16K 3/0272; F16K 27/044; Y10T 137/6072–6082
See application file for complete search history.

(56) References Cited

U.S. PATENT DOCUMENTS

| 2,610,820 A |   | 9/1952 | Markel |
| 2,786,644 A | * | 3/1957 | Koppl .................. F16K 3/0272 |
|             |   |        | 251/187 |
| 2,935,166 A |   | 9/1960 | Carlson, Jr. |
| 3,082,792 A |   | 3/1963 | Jenkins |

(Continued)

FOREIGN PATENT DOCUMENTS

| CN | 2121592 | 11/1992 |
| CN | 101093034 | 12/2007 |

(Continued)

OTHER PUBLICATIONS

International Search Report and Written Opinion dated Jul. 5, 2021 in related PCT Application No. PCT/US2021/022689.

(Continued)

*Primary Examiner* — Kevin F Murphy
(74) *Attorney, Agent, or Firm* — Hogan Lovells US LLP

(57) ABSTRACT

A valve assembly includes a valve body having a flow bore extending along a valve body axis from a first end to a second end, wherein at least one of the first end or the second end includes an opening adapted to receive a fluid end, the opening having an opening diameter sized to enable at least one of a valve member, a valve stem, or a valve seat to be installed through the opening. The valve assembly also includes an actuator adapted to drive movement of a valve member between an open position and a closed position. The valve assembly further includes a bonnet coupled to the actuator, the bonnet being coupled to the valve body at a top location, the bonnet being coupled to the valve body while at least one of the valve member, the valve stem, or the valve seat is installed through the opening.

20 Claims, 7 Drawing Sheets

(56) References Cited

U.S. PATENT DOCUMENTS

| | | | |
|---|---|---|---|
| 3,115,068 A | 12/1963 | Lofink | |
| 3,139,898 A | 7/1964 | Wiltgen | |
| 3,146,682 A | 9/1964 | Price et al. | |
| 3,175,473 A | 3/1965 | Boteler et al. | |
| 3,249,117 A * | 5/1966 | Edwarde | F16K 31/523 137/315.3 |
| 3,293,992 A | 12/1966 | Baumann | |
| 3,380,470 A | 4/1968 | Culpepper, Jr. et al. | |
| 3,593,959 A | 7/1971 | Greene | |
| 3,792,717 A | 2/1974 | Tibbals | |
| 3,811,457 A | 5/1974 | Crossman | |
| 3,882,400 A | 5/1975 | Lewis | |
| 3,955,793 A | 5/1976 | Burkhardt et al. | |
| 3,958,592 A | 5/1976 | Wells | |
| 3,993,284 A | 11/1976 | Lukens, Jr. | |
| 4,059,250 A * | 11/1977 | Guldener | F16K 27/067 251/304 |
| 4,135,546 A | 1/1979 | Morrison | |
| 4,135,547 A | 1/1979 | Akkerman | |
| 4,187,764 A | 2/1980 | Cho | |
| 4,274,432 A | 6/1981 | Tunstall et al. | |
| 4,281,819 A * | 8/1981 | Linder | F16K 3/316 251/282 |
| 4,309,022 A | 1/1982 | Reinicke et al. | |
| 4,354,425 A | 10/1982 | Bruton et al. | |
| 4,424,738 A | 1/1984 | Leighton | |
| 4,468,039 A * | 8/1984 | Le | F16K 41/02 251/214 |
| 4,480,811 A | 11/1984 | Card et al. | |
| 4,489,756 A | 12/1984 | Balz | |
| 4,491,060 A | 1/1985 | Boski | |
| 4,527,769 A | 7/1985 | Stogner et al. | |
| 4,529,330 A | 7/1985 | Boski | |
| 4,585,207 A | 4/1986 | Shelton | |
| 4,620,562 A | 11/1986 | Pacht | |
| 4,624,442 A | 11/1986 | Duffy et al. | |
| 4,633,898 A | 1/1987 | Denk | |
| 4,650,151 A | 3/1987 | McIntyre | |
| 4,721,284 A | 1/1988 | Bankard | |
| 4,768,545 A | 9/1988 | Hoffman | |
| 4,782,852 A | 11/1988 | Legris | |
| 4,871,143 A | 10/1989 | Baker | |
| 4,934,403 A | 6/1990 | Mooney | |
| 4,959,506 A | 9/1990 | Petty | |
| 4,967,785 A | 11/1990 | Young | |
| 5,067,392 A | 11/1991 | Gautier | |
| 5,294,090 A | 3/1994 | Winnike | |
| 5,377,955 A * | 1/1995 | Baker | F16K 3/0263 251/327 |
| 5,464,040 A | 11/1995 | Johnson | |
| 5,499,648 A | 3/1996 | Powell et al. | |
| 5,964,446 A | 10/1999 | Walton et al. | |
| 6,015,134 A | 1/2000 | Johnson | |
| 6,041,804 A | 3/2000 | Chatufale | |
| 6,050,541 A | 4/2000 | Chatufale | |
| 6,086,039 A | 7/2000 | Sievers et al. | |
| 6,089,531 A | 7/2000 | Young | |
| 6,131,881 A | 10/2000 | Preisser | |
| 6,397,892 B1 | 6/2002 | Pyle et al. | |
| 6,487,960 B1 | 12/2002 | Chatufale | |
| 6,659,419 B2 | 12/2003 | Chatufale | |
| 6,672,331 B2 | 1/2004 | Heald | |
| 6,684,897 B2 | 2/2004 | Sundararajan | |
| 6,854,704 B1 | 2/2005 | Young | |
| 7,124,774 B2 | 10/2006 | Weingarten | |
| 7,159,839 B2 | 1/2007 | Tanikawa et al. | |
| 7,261,121 B2 | 8/2007 | Bordonaro | |
| 7,261,122 B2 | 8/2007 | Bordonaro | |
| 7,481,239 B2 | 1/2009 | McGuire | |
| 7,647,861 B2 | 1/2010 | Bessman | |
| 8,282,070 B2 | 10/2012 | Davies, Jr. | |
| 8,322,359 B2 | 12/2012 | Zecchi et al. | |
| 8,708,309 B2 | 4/2014 | Roper et al. | |
| 8,864,102 B2 | 10/2014 | Gamache | |
| 8,910,658 B2 | 12/2014 | Adams et al. | |
| 8,991,420 B2 | 3/2015 | Adams et al. | |
| 8,998,166 B2 | 4/2015 | Adams et al. | |
| 9,033,308 B2 | 5/2015 | Kiesbauer et al. | |
| 9,212,758 B2 | 12/2015 | Adams | |
| 9,568,117 B2 | 2/2017 | Adams et al. | |
| 9,759,240 B2 | 9/2017 | McEvoy et al. | |
| 11,125,343 B2 | 9/2021 | Choate | |
| 2001/0027817 A1 * | 10/2001 | Giacomini | F16L 41/03 137/884 |
| 2002/0175303 A1 | 11/2002 | Chatufale | |
| 2003/0034465 A1 | 2/2003 | Adams et al. | |
| 2003/0052293 A1 | 3/2003 | Enzaki | |
| 2004/0007682 A1 | 8/2004 | Engle et al. | |
| 2005/0087712 A1 | 4/2005 | Lymberopoulos | |
| 2007/0290154 A1 | 12/2007 | Aoyama | |
| 2009/0095933 A1 | 4/2009 | McGuire | |
| 2009/0095934 A1 | 4/2009 | Cain | |
| 2011/0240126 A1 | 10/2011 | Lymberopoulos et al. | |
| 2012/0227983 A1 | 9/2012 | Lymberopoulos et al. | |
| 2012/0318388 A1 | 12/2012 | Du | |
| 2014/0000907 A1 | 1/2014 | Olvera | |
| 2014/0138564 A1 | 5/2014 | Adams et al. | |
| 2014/0174554 A1 | 6/2014 | Meyberg et al. | |
| 2014/0183396 A1 | 7/2014 | Hunter | |
| 2014/0217320 A1 | 8/2014 | DeOcampo | |
| 2014/0332707 A1 | 11/2014 | Reilly | |
| 2015/0204456 A1 | 7/2015 | Adams et al. | |
| 2016/0312904 A1 | 10/2016 | Hoang | |
| 2017/0191570 A1 | 7/2017 | Roberts | |
| 2017/0343108 A1 | 11/2017 | Hoang | |
| 2018/0156338 A1 | 6/2018 | Sundararajan | |
| 2019/0195386 A1 | 6/2019 | Choate | |
| 2019/0264818 A1 | 8/2019 | Powell | |
| 2019/0277409 A1 | 9/2019 | Puranik | |

FOREIGN PATENT DOCUMENTS

| | | |
|---|---|---|
| CN | 202302237 | 7/2012 |
| CN | 202432085 | 9/2012 |
| DE | 102011015646 | 10/2012 |
| EP | 0416966 | 3/1991 |
| EP | 0486824 | 5/1992 |
| FR | 1195213 | 11/1959 |
| GB | 1148817 | 4/1969 |
| GB | 2022704 | 12/1979 |
| GB | 2168787 | 6/1986 |
| GB | 2303199 | 2/1997 |
| JP | 2008069795 | 3/2008 |
| JP | 2010048271 | 3/2010 |
| WO | 2014099505 | 6/2014 |

OTHER PUBLICATIONS

International Search Report and Written Opinion dated Jul. 5, 2021 in related PCT Application No. PCT/US2021/022692.

Office Action dated Nov. 26, 2021 in related U.S. Appl. No. 16/829,523.

PCT International Preliminary Report on Patentability issued in connection with corresponding PCT Application No. PCT/US2016/036328 dated Dec. 21, 2017.

Actuators Pressure Control CHA Top Access Standard Hydraulic Actuator, GE Oil & Gas, 2013.

International Search Report and Written Opinion issued in connection with related PCT Application No. PCT/US2013/067666, dated Mar. 3, 2014.

International Search Report and Written Opinion issued in connection with related PCT Application No. PCT/US13/077392, dated Mar. 7, 2014.

Non-Final Rejection towards related U.S. Appl. No. 13/679,553 dated Mar. 28, 2014.

International Search Report and Written Opinion issued in connection with related PCT Application No. PCT/US2013/074223 dated Apr. 3, 2014.

Non-Final Rejection towards related U.S. Appl. No. 13/717,073 dated Jul. 31, 2014.

(56) References Cited

OTHER PUBLICATIONS

Non-Final Rejection towards related U.S. Appl. No. 14/107,589 dated Aug. 13, 2014.
Final Rejection towards related U.S. Appl. No. 13/679,553 dated Oct. 17, 2014.
Notice of Allowance issued in connection with related U.S. Appl. No. 13/679,553 dated Nov. 21, 2014.
Non-Final Rejection towards related U.S. Appl. No. 14/673,178 dated Jul. 30, 2015.
International Search Report and Written Opinion issued in connection with related PCT Application No. PCT/US2015/49556, dated Nov. 19, 2015.
Actuators NoBolt Dual Seal Pneumatic Actuator, GE Oil & Gas, 2015.
Office Action issued in connection with related CN Application No. 201380070284.5 dated May 25, 2016.
Office Action issued in connection with related CN Application No. 201380074076.2 dated Jun. 30, 2016.
Office Action issued in connection with related CN Application No. 201380070678.0 dated Jul. 5, 2016.
Non-Final Rejection towards related U.S. Appl. No. 14/673,178 dated Jul. 15, 2016.
PCT Search Report and Written Opinion for related application PCT/US2013/077412 dated Mar. 7, 2014.
U.S. Appl. No. 62/172,544, filed Jun. 8, 2015.

* cited by examiner

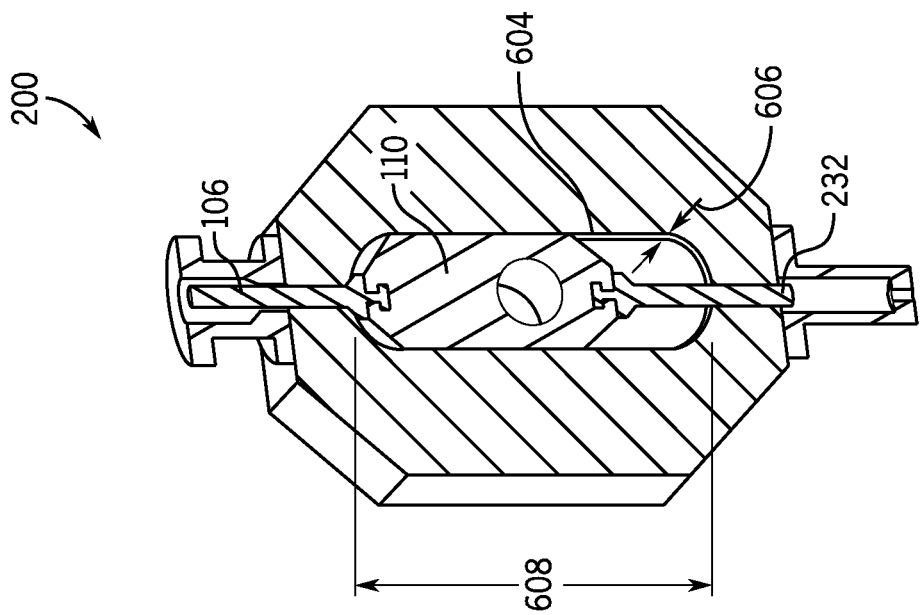
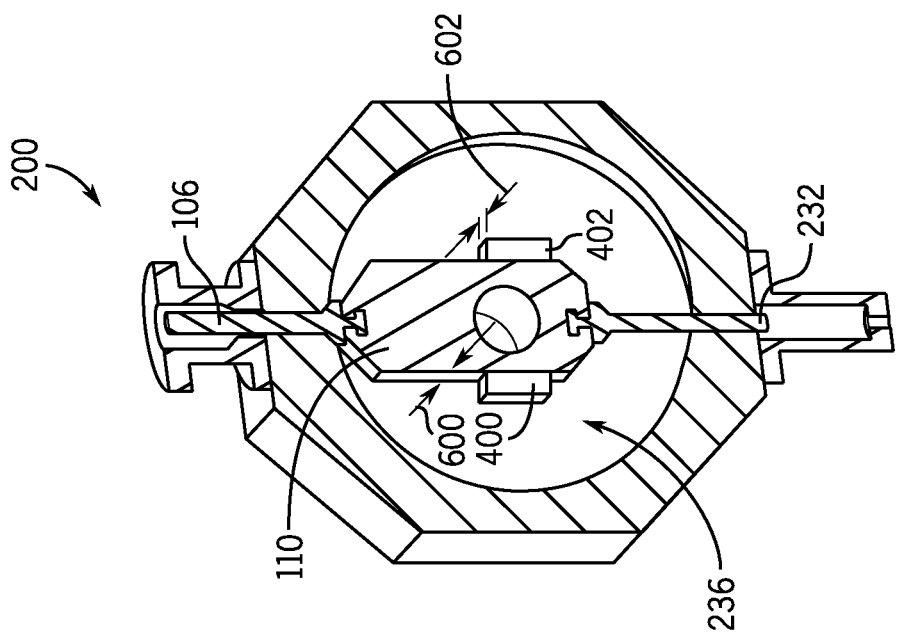

SIDE ENTRY VALVE

BACKGROUND

1. Field of the Invention

The present disclosure relates in general to valve systems and more particularly to systems and methods for side entry valves.

2. Description of Related Art

Valves are used in a variety of industries to regulate fluid flow. In certain industries, such as oil and gas drilling and recovery, the fluid flow may be at high pressures and may include particulates or acids that damage interior components of the valves. As a result, replacement or repairs may be part of regular maintenance operations. Moreover, space and time may be at a premium at work sites, wherein large valves may be difficult to maintain, difficult to move, and also time consuming. Traditional valves install various components through a top portion (e.g., along a valve stem axis) and include various additional components to facilitate such a configuration, leading to larger valves that have more parts.

SUMMARY

Applicants recognized the problems noted above herein and conceived and developed embodiments of systems and methods, according to the present disclosure, for valve systems.

In an embodiment, a valve assembly includes a valve body having a stem bore extending along a stem axis and a flow bore extending along a valve body axis, the stem axis and the flow bore being substantially perpendicular. The valve assembly also includes a fluid end adapted to couple to the valve body at an opening, the opening being in a side of the valve body and substantially aligned with the valve body axis, the fluid end having a plurality of fluid end lugs, extending radially outward from the valve body axis and arranged circumferentially about the fluid end, the plurality of fluid end lugs separated by respective gaps of a plurality of gaps, the fluid end being translatable along the axis between a coupled position and a decoupled position, wherein the plurality of fluid end lugs axially move through a plurality of valve body slots as the fluid end transitions from the decoupled position to the decoupled position, and the fluid end is rotatably placed into the coupled position after moving through the plurality of valve body slots. The valve assembly also includes one or more valve internal components, installed through the opening when the fluid end is in the decoupled position.

In another embodiment, a valve assembly includes a valve body having a flow bore extending along a valve body axis from a first end to a second end, wherein at least one of the first end or the second end includes an opening adapted to receive a fluid end, the opening having an opening diameter sized to enable at least one of a valve member, a valve stem, or a valve seat to be installed through the opening. The valve assembly also includes an actuator adapted to drive movement of a valve member between an open position and a closed position. The valve assembly further includes a bonnet coupled to the actuator, the bonnet being coupled to the valve body at a top location, the bonnet being coupled to the valve body while at least one of the valve member, the valve stem, or the valve seat is installed through the opening.

In an embodiment, a method for assembling a valve includes removing a fluid end, from an opening formed in a side of a valve body. The method also includes removing one or more valve components from an interior portion of the valve body, the one or more valve components being removed through the opening. The method further includes installing one or more new valve components into the interior portion of the valve body, through the opening. The method also includes coupling the fluid end to the opening.

BRIEF DESCRIPTION OF DRAWINGS

The present technology will be better understood on reading the following detailed description of non-limiting embodiments thereof, and on examining the accompanying drawings, in which:

FIGS. 6A and 6B are cross-sectional perspective views of embodiments of a valve assembly including a valve member guide, in accordance with embodiments of the present disclosure.

DETAILED DESCRIPTION

Figure 1:
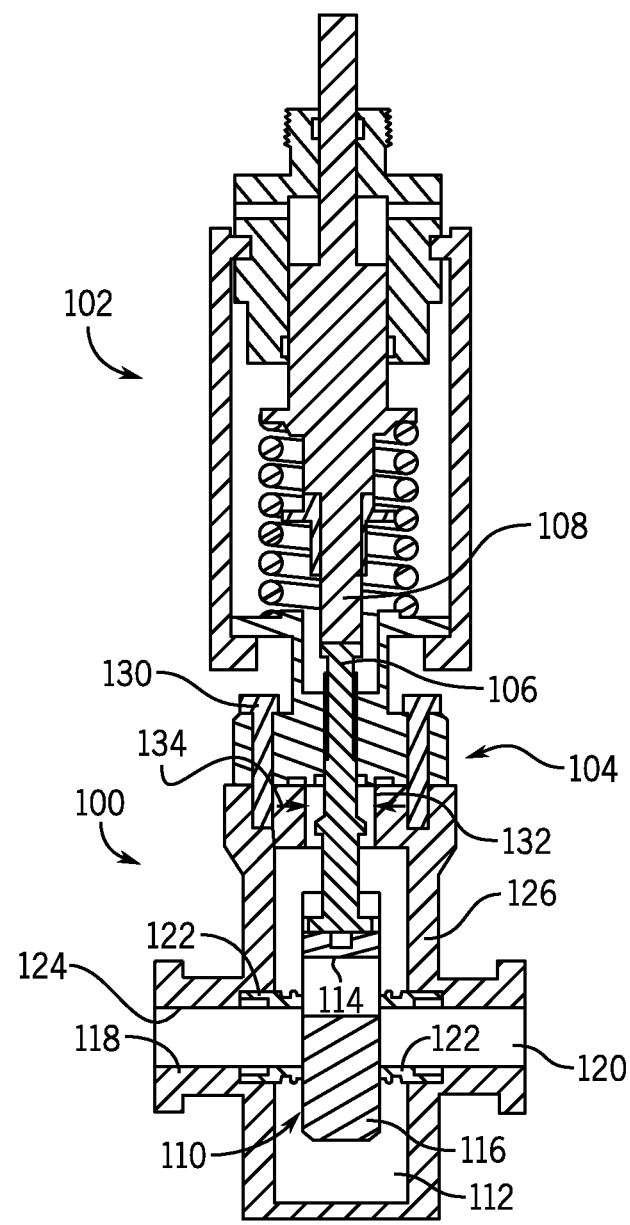
FIG. 1 is a schematic cross-sectional view of an embodiment of a valve assembly having an actuator, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure.

Embodiments of the present disclosure are directed toward a side entry valve, such as a gate valve, where various internal valve components may be installed from a side area (e.g., along a fluid flow path) as opposed to from a top or bottom portion (e.g., perpendicular to the flow path). Such a configuration eliminates a traditional bonnet and/or removal of the bonnet to facilitate valve repairs, in various embodiments, and reduces a number of parts, such as various bolts and seals. Moreover, a seal pocket, bore, and ring groove are readily accessible for replacement without re-cladding the valve body. As a result, valves may be maintained with less work for operations and less down time due to the removal of various components of the valve. Additionally, costs may be reduced by reducing the number of valve components.

Embodiments of the present disclosure may be directed toward systems and methods for rapid valve repair and construction. For example, in various embodiments, the valve may include at least one quick connection system for coupling a fluid end to the valve. Such valve fluid ends and quick connection systems are described in U.S. patent application Ser. No. 16/829,523, titled "VALVE END REPLACEMENT SYSTEM AND METHOD," filed by Baker Hughes Oilfield Operations LLC, which is hereby incorporated by reference in its entirety. An opening in the valve, which receives the valve end, may be sized to enable several valve components, such as the stem, valve member, valve seats, etc. to be installed through the side of the valve (e.g., along the flow path), thereby eliminating installation from the top or bottom of the valve, as is typical with existing valves. Such a configuration enables a more compact valve format, as well as potentially removes various components such as a bolted bonnet, fasteners, and the like.

In various embodiments, methods may include removing a valve fluid end that is arranged substantially parallel to a fluid flow path. Additionally, methods may include installing one or more valve components through a side opening in the valve, wherein the side opening is arranged substantially parallel to the fluid flow path. Furthermore, methods may include reinstalling the valve fluid end, into the side opening. In this manner, the valve may be quickly and easily disassembled, which enables component repair or replacement, without removing a variety of fasteners. However, it should be appreciated that, in certain embodiments, the valve fluid end may include one or more fasteners, such as bolts, which may be removed.

FIG. 1 is a cross-sectional side elevation view of an embodiment of a valve assembly 100 that includes an actuator 102 coupled to a bonnet 104. It should be appreciated that while the illustrated actuator 102 is an automated or controlled actuator, that manual operators may also be utilized within the scope of the present disclosure. The illustrated actuator 102 is coupled to a valve stem 106, via a connector 108 that extends through a central bore and couples to a valve member 110 arranged within a chamber 112. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, a bore 124 extends through a valve body 126 along a valve body axis 128. The fluid is at a pressure and travels through the bore 124, for example, when the valve member 110 is positioned in an open position. In certain operations, such as fracturing operations, the fluid may include particulates, such as proppant, that may erode sections of the valve body 126, the valve seats 122, and/or the valve member 110, for example, along the bore 124. Additionally, the fluid may contain corrosive materials and be at a high pressure, which may further damage internal components of the valve. Accordingly, it may be desirable to replace portions of the valve body 126, the valve member 110, and/or the valve seats 122 without replacing the entire valve assembly 100. However, such repairs are often time consuming and costly. For example, various components may be removed, which is performed by removing the bonnet 104, removing the actuator 102, and then removing components from a top of the valve body 126. Additionally, various components may be re-clad or otherwise reworked, which may be time consuming and costly, due to being directly coupled to different components. As will be described herein, embodiments of the present disclosure provide for a side entry valve that enables repair and replacement of various components along the bore 124 (e.g., along the valve body axis 128), rather than through a top of bottom of the valve.

The illustrated valve assembly 124 includes the bonnet 104 secured to the valve body 126 via fasteners 130. While FIG. 1 is illustrated in cross-section, there may be several fasteners 130, which may vary in size, and as a result, installation and/or removal of the bonnet 104 may be time consuming. Moreover, each fastener 130 represents a potential leak path. During assembly, interior components of the valve may be installed through a stem bore 132. That is, a bore diameter 134 may be larger than respective diameters of the interior components, such as the valve member 110, the stem 106, and the like. Accordingly, components may be installed through the top of the valve, which necessitates removal of the bonnet 104. However, removal is undesirable due to the number of fasteners 130 that will be removed, cleaned, and subsequently reinstalled. This time consuming process may lead to high costs for labor, as well as down time at the well site where repairs are made in the field. Additionally, properly torquing the fasteners 130 (when the fasteners are bolts, for example) are also time consuming and challenging, where improper torquing may lead to leaks and the like. Embodiments of the present disclosure may overcome these challenges by providing installation through a side opening. As a result, the actuator 102 and/or bonnet 104 may remain attached to the valve body 126. Furthermore, in various embodiments, the bonnet 104 and various fasteners may be removed and/or reduced in number, thereby simplifying the valve and reducing the number of components used, which may reduce the valve weight and also costs associated with the valve.

Figure 2:
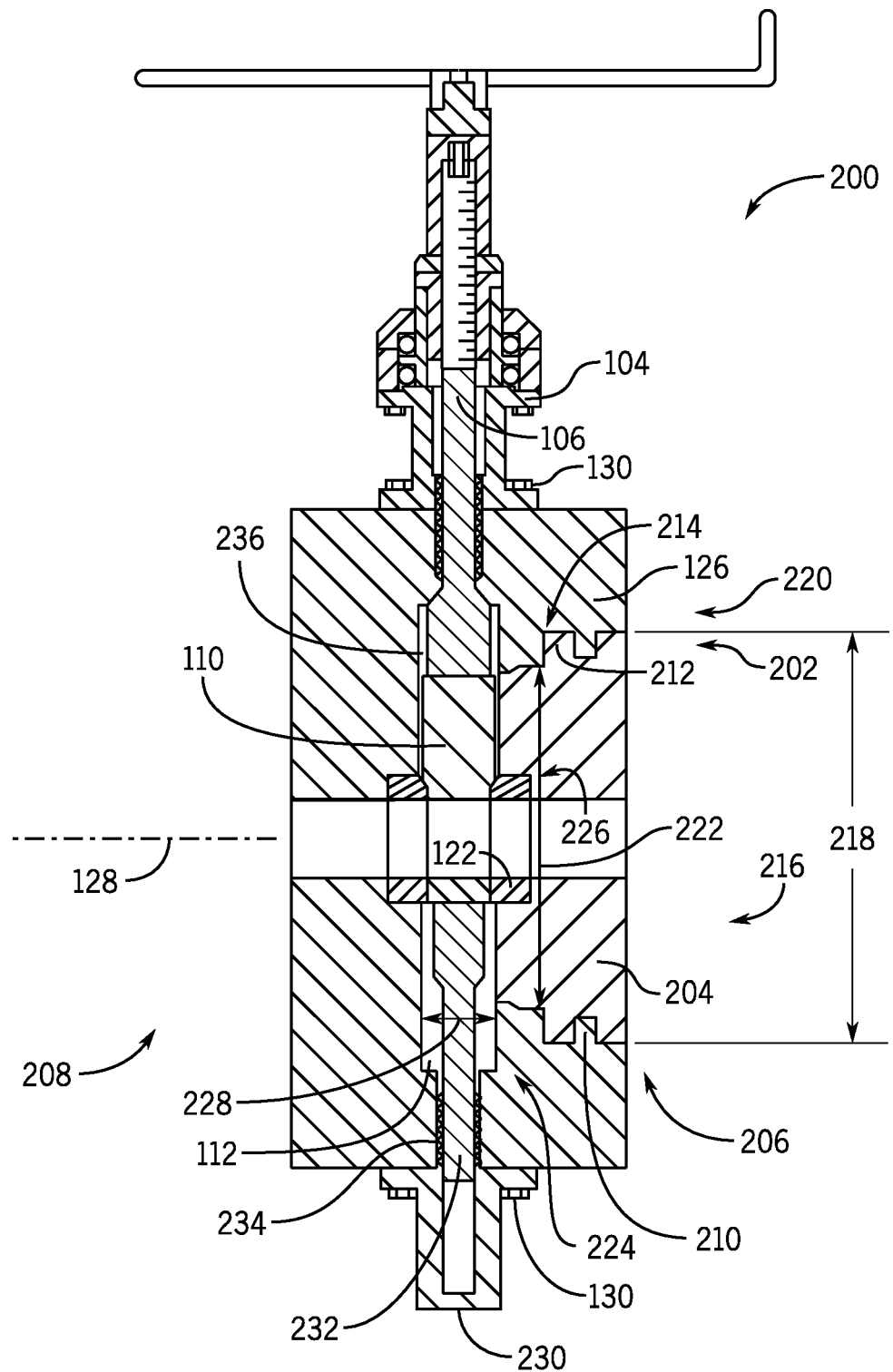
FIG. 2 is a schematic cross-sectional view of an embodiment of a valve assembly having a quick connect fluid end for side entry, in accordance with embodiments of the present disclosure.

FIG. 2 is a cross-sectional side elevation view of an embodiment of a valve assembly 200 that shares several similar features with the valve assembly 100 of FIG. 1, such as the valve body 126, stem 106, valve member 110, and others, which will be identified with like reference numerals for convenience purposes only and not to limit the scope of the present disclosure. The illustrated valve assembly includes a quick connection system 202 for coupling a fluid end 204 to an outlet end 206. It should be appreciated that while the quick connection system 202 is illustrated at the outlet end 206, the quick connection system 202 and an associated fluid end may also be formed at an inlet end 208. Moreover, the quick connection system 202 is provided for illustrative purposes only to illustrate a connection mechanism that reduces and/or eliminates fasteners, such as bolts, but traditional coupling mechanisms that utilize fasteners may also be used in embodiments of the present disclosure.

The quick connection system 202 of FIG. 2 refers to the mating and coupling features between the valve body 126 and the fluid end 204. For example, body lugs 210 extend radially inward from the valve body 126. The body lugs 210 extend for a body lug circumferential distance (not pictured) and adjacent body lugs 210 are separated by spaces (not pictured). The spaces also extend for a space circumferential distance. In the illustrated embodiment, the fluid end 204 includes fluid end lugs 212 that extend radially outward. The fluid end lugs 212 are also arranged circumferentially about the fluid end 204 and extend for a fluid end lug circumferential distance (not pictured) and adjacent fluid end lugs 212 are separated by gaps (not pictured). The respective gaps extend for a gap circumferential distance. In operation, the fluid end lugs 212 align with the spaces such that the fluid end 204 may be moved axially along the valve body axis 128, thereby positioning the fluid end lugs 212 within a slot 214 formed in the valve body 126. Thereafter, at least one of the fluid end 204 and/or the valve body 126 may be rotated about the valve body axis 128 to move the fluid end lugs 212 into alignment with the body lugs 210, thereby blocking further axial movement of the fluid end 204.

As illustrated in FIG. 2, the fluid end 204 is arranged within an opening 216 formed in the valve body 126. The opening 216 has an opening diameter 218, which as will be described below, may be particularly selected to facilitate installation of one or more internal components of the valve. Additionally, the opening 216 has a variable diameter where the opening diameter 218 is at an outside or exterior portion 220 and an inner opening diameter 222 is at an inside or interior portion 224. As used herein, interior refers to the portion that is closer to the valve stem 106 (when the valve stem is installed) and exterior refers to the portion that is further from the valve stem 106 (when the valve stem is installed).

The fluid end 204 further includes a recessed portion 226 that receives the valve seat 122. As will be appreciated, the valve seat 122 may be exposed to corrosive fluids and/or abrasive particulates, and as a result, may wear out. Embodiments of the present disclosure facilitate rapid replacement of the valve seat 122. Furthermore, the opening 216 may be sized to further facilitate replacement of the opposite (e.g., inlet end 208) valve seat 122. In the illustrated embodiment, the fluid end 204 therefore forms at least a portion of the chamber 112. As will be described below, a chamber diameter 228 may be smaller than chamber diameters of prior art valves due to the configuration and arrangement of the valve assembly of the present disclosure.

As shown in FIG. 2, the illustrated valve assembly 200 is a balanced stem valve that includes an upper bonnet 104 and a lower bonnet 230. The lower bonnet 230 receives a lower stem 232 that extends through a lower bore 234 and couples to the valve member 110. Additionally, as noted above, the upper bonnet 104 and upper stem 106 also couple to the valve member 110. It should be appreciated that embodiments may also be utilized with valves that are not balanced stem valves, and that the balanced stem valve is shown for illustrative purposes only. The illustrated bonnets 104, 230 are coupled to the valve body 126 via fasteners 130. However, as will be described below, various interior components of the valve may be replaced and/or removed without decoupling the bonnets 104, 230 from the valve body 126, thereby reducing time to perform maintenance on the valve.

In the illustrated valve assembly 200 includes the valve member 110 arranged within the chamber 112 having both the upper stem 106 and the lower stem 232 coupled to opposite ends. The valve member 110 is further arranged within a valve member guide 236 (e.g., gate guide), which may be utilized to position the valve member 110 within the chamber 112. For example, the valve member guide 236 may be coupled to at least a portion of the valve body 126, such as within the chamber 112, such that a valve member alignment position can be readily identified when viewed through the opening 216. However, it should be appreciated that other methods may be utilized, such as a recess or pathway for the valve member 110, as well removal of guides entirely.

Figure 3:
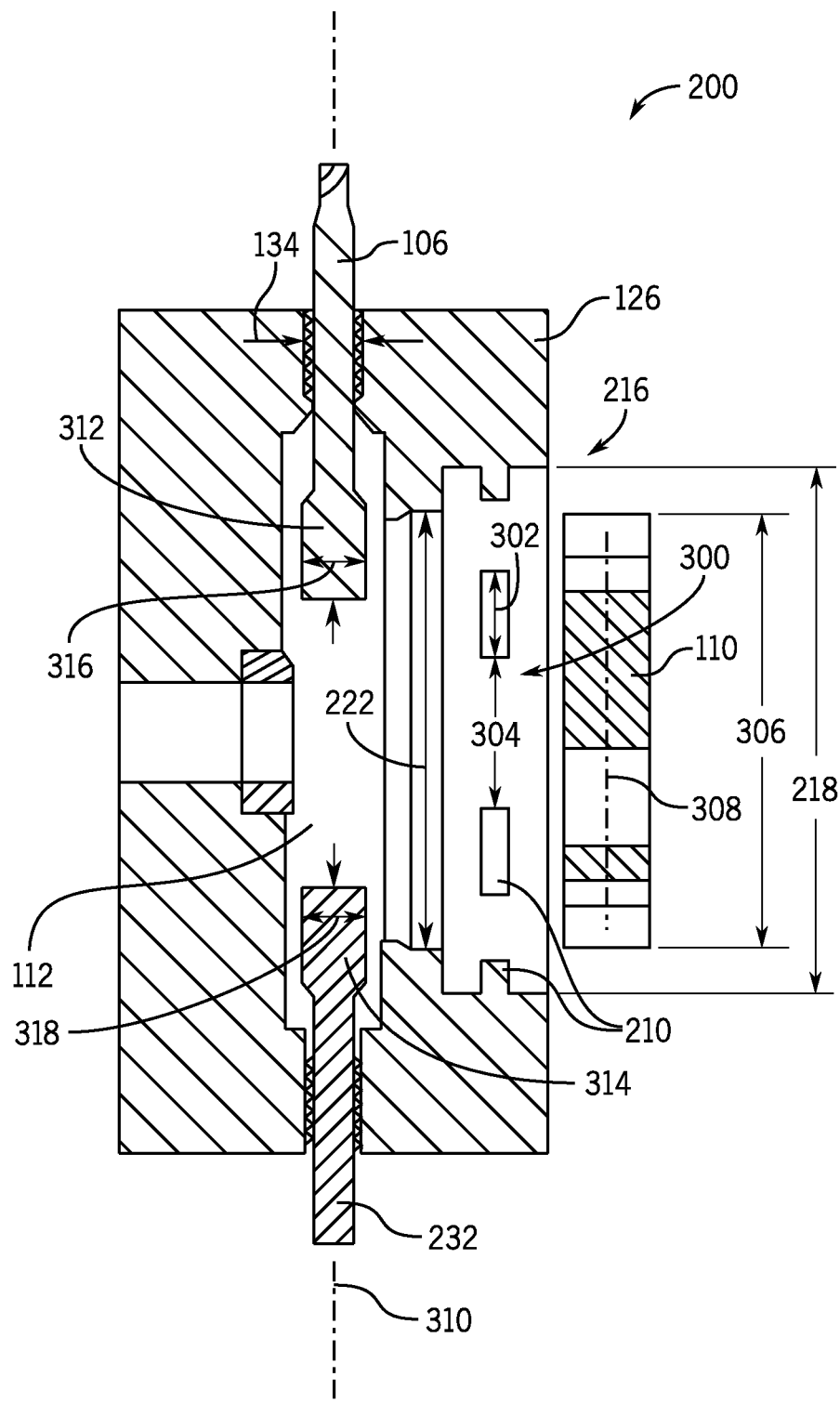
FIG. 3 is a schematic cross-sectional view of an embodiment of a valve assembly having components installed through a side opening, in accordance with embodiments of the present disclosure.

FIG. 3 is a cross-sectional side view of an embodiment of the valve assembly 200 where the fluid end 204 is removed. It should be appreciated that the bonnets 104, 230 have been removed for clarity, but in various embodiments, the bonnets 104, 230 may remain coupled when various components are added and/or removed from the valve. The illustrated embodiment includes the opening 216 for receiving the fluid end 204. The body lugs 210 are illustrated as extending circumferentially about the opening 216 and include the spaces 300 extending between the adjacent body lugs 210. As noted above, the body lugs 210 extend for a body lug circumferential distance 302 and the spaces 300 extend for a space circumferential distance 304.

The valve member 110 is inserted into the chamber 112 via the opening 216, as illustrated by the arrow indicative of a direction of movement of the valve member 110. In the illustrated embodiment, a valve member length 306 is less than the opening diameter 218 and the inner opening diameter 222, thereby facilitating passage into the chamber 112. It should be appreciated that the valve member 110 may not necessarily be moved into the chamber 112 such that an axis 308 of the valve member 110 is substantially parallel to a stem axis 310. For example, there may be an angle, less than 90 degrees, between the axis 308 and the stem axis 310 such that the valve member 110 is installed at an angle, which would enable installation where at least one of the opening diameter 218 and/or the inner opening diameter 222 is smaller than the valve member length 306.

The illustrated includes both the upper stem 106 and the lower stem 232 already installed within the chamber 112. However, it should be appreciated that the stems 106, 232 may be installed in a similar manner as the valve member 110. For example, the stems 106, 232 may extend through the opening 216 and be positioned into the chamber 112. Such an arrangement is illustrated in FIG. 3 because the valve member connectors 312, 314 have a connector diameter 316, 318 that is larger than the bore diameter 134. As a result, installation through the bore 132 (e.g., from the top or bottom) is blocked. It should be appreciated that various seals and/or packers may be installed within the bore 132 to block fluid flow.

In operation, the stems 106, 232 are installed within the chamber 112 and then the valve member 110 is moved into the chamber 112. The valve member may be aligned with the valve member guide (not pictured for clarity) in embodiments where the valve member guide is present. Thereafter, the valve member connectors 312, 314 may engage the valve member 110. As shown, this alignment and connection is provided through the opening 216, which is aligned with the flow direction (e.g., along the valve body axis 128) and substantially perpendicular to the stem axis 310. Accordingly, the valve may be referred to as a side-entry valve because components are installed and removed through the side, as opposed to traditional valves that may utilize the top and/or bottom to install and/or remove components. After the components are installed, the fluid end 204 is coupled to the valve body 126 via the quick connection system described herein, thereby securing the components within the valve.

Figure 4:
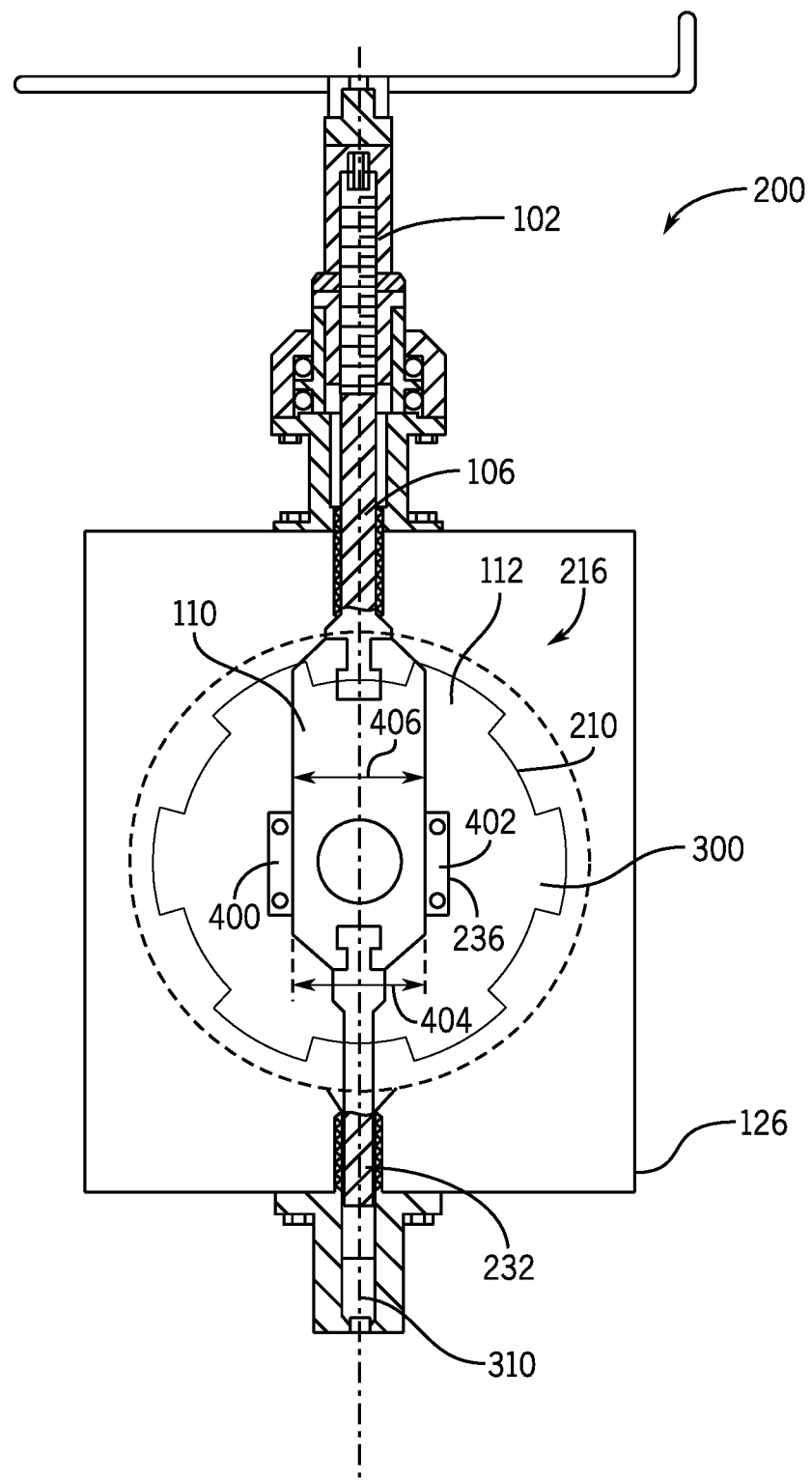
FIG. 4 is a schematic cross-sectional view of an embodiment of a valve assembly having an opening for side entry, in accordance with embodiments of the present disclosure.

FIG. 4 is cross-sectional side view of an embodiment of the valve assembly 200 illustrating a view from a perspective substantially aligned with the valve body axis 128. In the illustrated embodiment, the opening 216 is shown along with the body lugs 210 extending radially inward toward the valve body axis 128. As previously noted, the body lugs 210 are separated by the spaces 300. It should be noted that the number of body lugs 210 and spaces 300 is for illustrative purposes only, and there may be more or fewer in various embodiments. The embodiment includes the valve member 110 positioned within the chamber 112 within the valve member guide 236. The valve member guide 236 may be coupled the valve body 126, for example via one or more fasteners, and may provide a location for positioning the valve member 110 and/or maintaining a position of the valve member 110 during operation. As shown, the valve member 110 is coupled to the stems 106, 232. During operation, the actuator 102 drives movement of the valve member 110 along the stem axis 310, thereby moving between an open position and a closed position.

The illustrated valve member guide 236 includes a first guide body 400 and a second guide body 402 arranged in a spaced relationship and separated by a guide distance 404. The guide distance 404 is substantially equal to a valve member distance 406 representing a width of the valve member 110. As a result, movement of the valve member 110 in a direction substantially perpendicular to the valve body axis 128 may be blocked due to contact between the valve member 110 and the valve member guide 236. It should be appreciated that there may be a space between the respective bodies 400, 402 and the valve member 110 to reduce or eliminate friction to enable smooth opening and closing of the valve. Moreover, one or more of the bodies 400, 402 and/or the valve member 110 may include a coating to facilitate movement of the valve member 110.

Figure 5:
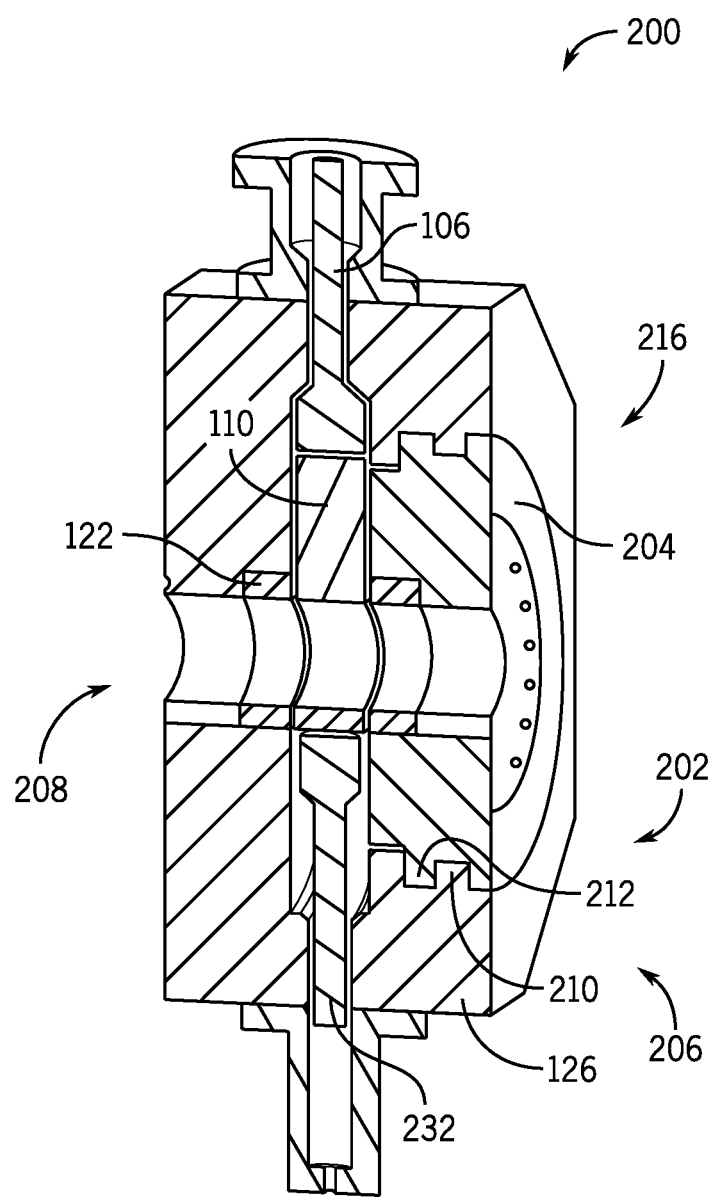
FIG. 5 is a cross-sectional perspective view of an embodiment of a valve assembly having components installed through a side opening, in accordance with embodiments of the present disclosure.

FIG. 5 is a cross-sectional perspective view of an embodiment of the valve assembly 200. The illustrated embodiment includes the valve internal components (e.g., the valve member 110, the stems 106, 232, etc.) arranged within at least a portion of the chamber 112. Further illustrated at the valve seats 122, which may engage at least a portion of the valve member 110 during operation to facilitate sealing of various passages within the valve.

The illustrated inlet end 208 is substantially solid and receives the valve seat 122 within a slot. However, it should be appreciated that the valve seat 122 may be integrally formed with the inlet end 208. In contrast, the outlet end 206 includes the quick connection system 202 for coupling the fluid end 204 and the valve body 126 together. The fluid end 204 is arranged within the opening 216, which provides access to the interior portion of the valve when the fluid end 204 is removed. The fluid end 204 includes the fluid end lugs 212 that engage the body lugs 210 to block axial movement of the fluid end 204 with respect to the valve body 126.

FIGS. 6A and 6B are cross-sectional views of embodiments of the valve assembly 200 illustrating the valve member guide 236. As noted above, the valve member guide 236 may be utilized to position the valve member 110 through the opening 216 and/or to restrict or block movement of the valve member 110 in a direction substantially perpendicular to the valve body axis 128. FIG. 6A includes the first guide body 400 and the second guide body 402 arranged the guide distance 404 away from one another. In the illustrated embodiment, a valve member thickness 600 is substantially equal to the guide body thickness 602. However, it should be appreciated that the valve member 110 may be thicker than the guide bodies 400, 402 and may interact with other guide bodies 400, 402 arranged on the fluid end 204.

FIG. 6B illustrates the valve member guide 236 including a guide passage 604. The guide passage 604 is recessed a passage distance 606 into the valve body 126, which may be substantially equal to the guide body thickness 602. However, as noted below, the fluid end 204 may also include a corresponding guide passage 604. The guide passage 604 has a guide length 608 that may substantially correspond to a stroke distance for the valve member 110. Accordingly, the guide length 608 may be particularly selected based on a directed axial movement of the valve member 110 along the stem axis 310.

Figure 7:
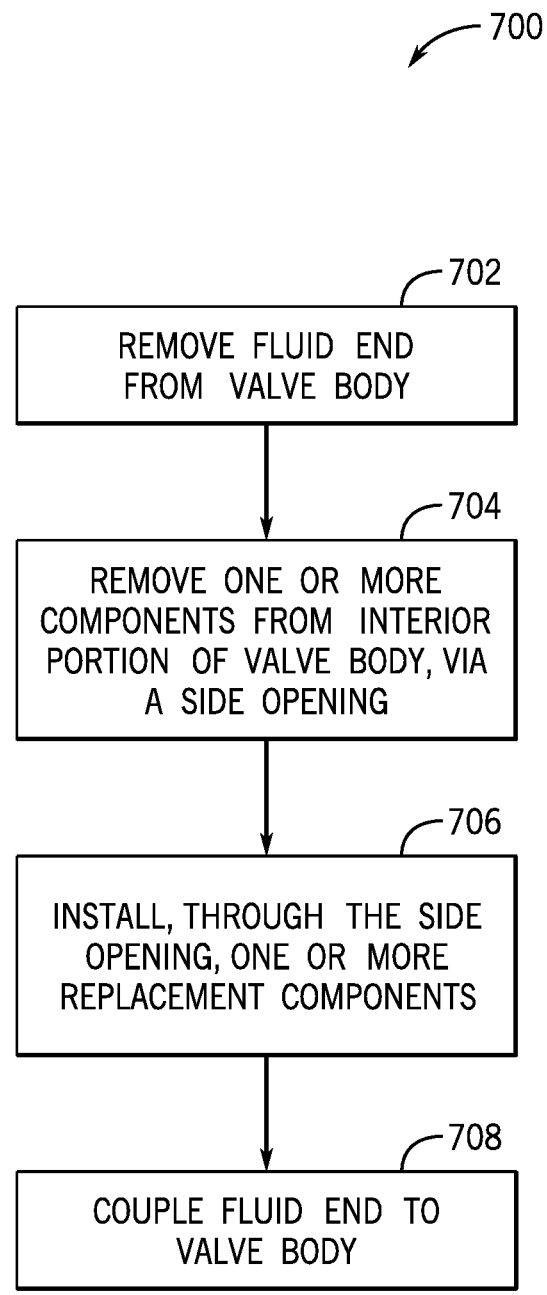
FIG. 7 is a flow chart of an embodiment of a method for maintaining a valve assembly using a side opening, in accordance with embodiments of the present disclosure.

FIG. 7 is a flow chart of a method 700 for replacing one or more valve components. It should be appreciated that steps for the method may be performed in any order, or in parallel, unless otherwise specifically stated. Moreover, the method may include more or fewer steps. In this example, a fluid end is removed from a valve body 702. For example, the fluid end may be removed utilizing a quick connection system, as described herein. Additionally, in embodiments, the fluid end may be coupled to the valve body via fasteners, which may be removed. The method also includes removing one or more components from an interior of the valve body 704. For example, the fluid end may be installed (or may cover) an opening at a side of the valve body. The opening may be aligned with a valve body axis that is substantially parallel to a flow direction through the valve. As a result, the components may be removed from the side of the valve, as described in detail above. Additionally, one or more components may be installed through the side of the valve body 706. For example, new or repaired components may be installed through the opening to position the component within a chamber. The new components may then be secured within the valve body. Thereafter, the fluid end may be coupled to the valve body 708. In this manner, repair and replacement of valve components may be performed through an opening in a side (e.g., parallel to a flow direction). As a result, removal of various components at a top or bottom, such as an actuator or bonnet, may be avoided, thereby reducing time and cost associated with valve repairs.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve assembly, comprising:
a valve body having a stem bore extending along a stem axis and a flow bore extending along a valve body axis, the stem axis and the flow bore being substantially perpendicular;
a fluid end adapted to non-threadingly couple to the valve body at an opening such that a pressure within the valve body is retained by a non-threaded connection that secures the fluid end to the valve body, the opening being in a side of the valve body and substantially aligned with the valve body axis, the fluid end having a plurality of fluid end lugs, extending radially outward from the valve body axis and arranged circumferentially about the fluid end, the plurality of fluid end lugs separated by respective gaps of a plurality of gaps, the fluid end being translatable along the valve body axis between a coupled position and a decoupled position, wherein the plurality of fluid end lugs axially move through a plurality of valve body slots as the fluid end is moved along the valve body axis, and the fluid end is rotatably placed into the coupled position after moving through the plurality of valve body slots; and
a valve stem installed through the opening when the fluid end is in the decoupled position; and
a valve member installed through the opening when the fluid end is in the decoupled position;
wherein a connection between the valve stem and the valve member is formed within a cavity of the valve body when the fluid end is in the decoupled position.

2. The valve assembly of claim 1, further comprising:
an actuator adapted to drive movement of the valve member between an open position and a closed position; and
a bonnet coupled to the actuator, the bonnet being coupled to the valve body.

3. The valve assembly of claim 1, further comprising:
a valve guide member arranged within the cavity.

4. The valve assembly of claim 3, wherein the valve guide member further comprises:
a first guide body; and
a second guide body.

5. The valve assembly of claim 3, wherein the valve guide member further comprises:
a guide passage being a recess formed in the valve body.

6. The valve assembly of claim 1, wherein an opening diameter is greater than a length of one or more internal components.

7. The valve assembly of claim 1, wherein one or more valve seats are installed through the opening when the fluid end is in the decoupled position.

8. A valve assembly, comprising:
a valve body having a flow bore extending along a valve body axis from a first end to a second end, wherein at least one of the first end or the second end includes an opening adapted to receive a fluid end to non-threadingly couple within the opening such that a pressure within the valve body is retained by a non-threaded connection that secures the fluid end to the valve body, the opening having an opening diameter sized to enable a valve member, a valve stem, and a valve seat to be installed through the opening;
an actuator adapted to drive movement of a valve member between an open position and a closed position; and
a bonnet coupled to the actuator, the bonnet being coupled to the valve body at a top location,
wherein a connection between the valve stem and the valve member is formed within a cavity of the valve body, the cavity formed between the first end and the second end, the connection being formed when the fluid end is decoupled from the valve body and after both the valve stem and the valve member have been installed through the opening.

9. The valve assembly of claim 8, further comprising:
a plurality of valve body lugs extending radially inward toward the valve body axis, the plurality of valve body lugs each having a valve body lug circumferential length less than an outer circumference of the valve body, wherein each valve body lug is separated from an adjacent valve body lug by a space; and
a plurality of fluid end lugs extending radially outward from the valve body axis, the plurality of fluid end lugs each having a first end lug circumferential length less than an outer circumference of the fluid end, wherein each fluid end lug is separated from an adjacent fluid end lug by a gap;
wherein the fluid end is adapted to couple to the valve body by aligning the plurality of valve body lugs with respective gaps and axially translating the fluid end such that the fluid end lugs are arranged within a slot formed in the valve body.

10. The valve assembly of claim 8, wherein the opening diameter is greater than at least one of valve member length or a stem length.

11. The valve assembly of claim 8, wherein the opening diameter is less than at least one of a valve member length or a stem length, the valve member or the valve stem being arranged at an acute angle when being installed through the opening.

12. The valve assembly of claim 8, further comprising:
a valve member guide blocking movement of the valve member in at least one direction.

13. The valve assembly of claim 12, wherein the valve member guide is at least one of coupled to the valve body or integrally formed in the valve body.

14. The valve assembly of claim 8, wherein the valve stem, after being installed through the opening, is positioned such that a first portion of the valve stem, coupled to the actuator, is moved in a vertical direction, substantially perpendicular to the valve body axis.

15. The valve assembly of claim 8, further comprising:
a second bonnet, coupled to a bottom of the valve body, opposite the bonnet.

16. The valve assembly of claim 15, wherein the valve assembly is a balanced stem valve.

17. A method for assembling a valve, comprising:
removing a fluid end, from an opening formed in a side of a valve body;
removing one or more valve components from an interior portion of the valve body, the one or more valve components being removed through the opening;
installing a valve stem and a valve member into the interior portion of the valve body, through the opening;
coupling the valve stem to the valve member within a cavity of the valve body, the connection being formed within the cavity through the opening; and non-threadingly coupling the fluid end to the opening such that a pressure within the valve body is retained by a non-threaded connection that secures the fluid end to the valve body.

18. The method of claim 17, further comprising:
installing a bonnet on a top portion of the valve body, the bonnet being coupled to the valve body when the one or more valve components are removed.

19. The method of claim 17, further comprising:
aligning the valve member with a valve member guide.

20. The method of claim 17, further comprising:
aligning the valve stem with a bore extending through a top portion of the valve body, the bore being substantially perpendicular to the opening; and
axially translating the valve stem through the bore, in a direction substantially perpendicular to the opening.

\* \* \* \* \*